United States Patent [19]

Riel et al.

[11] Patent Number: 5,041,527

[45] Date of Patent: * Aug. 20, 1991

[54] DIMER FOR SYNTHESIS OF HIGH PERFORMANCE POLYMER MATRIX COMPOSITES

[75] Inventors: Frank J. Riel, San Diego; Tuyet T. Vuong, Elsinore, both of Calif.

[73] Assignee: Rohr Industries, Inc., Chula Vista, Calif.

[*] Notice: The portion of the term of this patent subsequent to Aug. 20, 2008 has been disclaimed.

[21] Appl. No.: 194,321

[22] Filed: May 16, 1988

[51] Int. Cl.$^5$ .................... C08G 8/02; C08G 69/26
[52] U.S. Cl. .................... 528/353; 528/125; 528/128
[58] Field of Search .................... 528/353, 125, 128

[56] References Cited

U.S. PATENT DOCUMENTS

| | | | |
|---|---|---|---|
| 3,697,345 | 10/1972 | Vaughan et al. | 528/353 |
| 3,708,459 | 1/1973 | Lubowitz | 528/353 |

OTHER PUBLICATIONS

Chemical & Engineering News; "Advanced Polymer Composites Tailored for Aerospace Use", pp. 37-57 ; Jul. 23, 1990.

35th International SAMPE Symposium, "A New PMR Addition Polyimide Having Improved Toxicity, Outlife and Processing Properties"; R. B. Baggett et al.; Apr. 2-5, 1990.

Paul H. Lindenmeyer et al., "Characterization of PMR Polyimide Resin and Prepreg", *NASA Contractor Report*, NASA CR-168217.

Raymond D. Vannucci, "PMR Polyimide Compositions for Improved Performance at 371° C.", published in SAMPE Quarterly, vol. 19, pp. 31 to 36 (1987).

Philip R. Young et al., "Characterization of Aging Effects of LARC-160", reprinted from *Resins for Aerospace*, American Chemical Society Symposium Series No. 132, pp. 479-490, (1980).

*Primary Examiner*—John Kight, III
*Assistant Examiner*—P. Hampton-Hightower
*Attorney, Agent, or Firm*—P. J. Schlesinger

[57] ABSTRACT

An improved synthesis for PMR-type polyimides, including first preparing a dimer of 5-norbornene-2,3-dicarboxylic acid, or acid ester or anhydride and 4,4'-methylenedianiline. This dimer is then reacted with the dimethyl ester of 3,3',4,4'-benzophenonetetracarboxylic acid and 4,4'-methylenedianiline. The resulting polyimide prepolymer exhibits superior physical properties and is substantially free of the undesired trimer of 5-norbornene-2,3-dicarboxylic acid, or acid ester or anhydride and 4,4'-methylenedianiline.

37 Claims, No Drawings

DIMER FOR SYNTHESIS OF HIGH PERFORMANCE POLYMER MATRIX COMPOSITES

FIELD OF THE INVENTION

An improved synthesis for a class of high temperature polyimides known as PMR, useful in the production of high performance polymer matrix composites.

TECHNOLOGY REVIEW

The application of polymer matrix composite materials was expanded by the development of a class of polyimides known as PMR, for in situ Polymerization of Monomer Reactants. Polymer matrix composite materials may be produced from PMR polyimides by impregnating the reinforcing fibers with a solution containing a mixture of monomers dissolved in a low boiling point solvent. The monomers are essentially unreactive at room temperature, but react in solution at elevated temperatures to form a high temperature stable polyimide matrix. The preparation of PMR polyimides is described in U.S. Pat. No. 3,745,149 by T. Serafini, et al.

Four thermal transitions occur during the overall cure of a PMR polyimide. The first and third transitions are endothermic and are related to the following: (1) melting of the monomer reactant mixture below 100° C., (2) in situ reaction of the monomers at about 140° C, and (3) melting of the norbornene terminated prepolymers in the range of 175° to 250° C. The second transition (above) and the fourth transition, centered near 340° C., are exothermic. The fourth transition is related to the addition cross-linking reaction.

A known PMR material is designated PMR-15. PMR-15 consists of a methanol solution of the monomethyl ester of 5-norbornene-2,3-dicarboxylic acid (NE), the dimethyl ester of 3,3',4,4'-benzophenonetetracarboxylic acid (BTDE), and 4,4'-methylenedianiline (MDA). However, it was reported in 1985 that aged PMR-15 resin solutions have poor physical properties, especially high temperature aging characteristics. See Lindenmeyer, et al. *Characterization of PMR Polyimide Resin and Prepreg* (NASA Contractor Report, NASA CR-168217). These authors report that their investigation has shown that PMR-15 resin solutions may be characterized by HPLC methods, and that final composite properties depend primary upon the amount of unreacted NE present in the prepreg prior to cure. At relatively low temperatures the NE and MDA appear to undergo a reaction that adversely affects the physical properties (especially the high temperature aging characteristics) of the resulting composites. The most likely reaction products of such a combination, the mono and bisimide, could not be confirmed as existing in the aged prepregs by these authors. Furthermore, the authors report that the deliberate addition of one of these materials, the monoimide, did not produce the same adverse effects on the aging characteristics.

An improved synthesis for polyimides has now been discovered, which significantly improves the physical properties and uniformity of PMR matrix composite materials.

SUMMARY OF THE INVENTION

The present invention provides an improved synthesis for high temperature polyimides known as PMR. The synthesis of the present invention may be used, for example, to prepare an improved PMR-15 polyimide.

The chemistry of the PMR-15 condensation reaction has in the past been generally represented by the following equations. These equations are not intended to imply separate interactions between the three ingredients, which may interact simultaneously. The abbreviations used in the equations are now more fully described. As used herein, nadic refers to 5-norbornene-2,3-dicarboxylic compounds. For example, nadic acid refers to 5-norbornene-2,3-dicarboxylic acid and nadic ester (NE) refers to the monomethyl ester of 5-norbornene-2,3-dicarboxylic acid.

NA = Anhydride of 5-norbornene-2,3-dicarboxylic acid

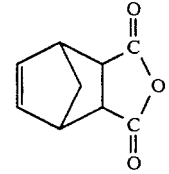

NE = Monomethyl Ester of 5-norbornene-2,3-dicarboxylic acid

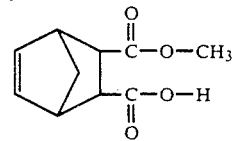

MDA = Methylene Dianiline

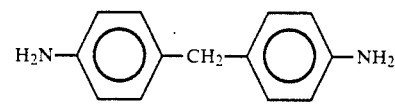

BTDE = Benzophenone Tetracarboxylic Acid, Dimethyl Ester

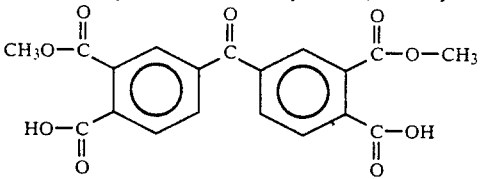

$$3\text{MDA} + 2\text{BTDE} \xrightarrow{\leq 200° \text{ C.}}$$

$$\text{MDA}-(\text{BTDE}-\text{MDA})_2 + \text{CH}_3\text{OH}$$

$$<200° \Big\downarrow -4\text{H}_2\text{O}$$

$$\text{MDA}-(\text{BTDE}-\text{MDA})_2$$
(Polyimide)

$$2\text{NE} + \text{MDA}-(\text{BTDE}-\text{MDA})_2 \xrightarrow{\leq 200° \text{ C.}}$$

$$\text{NE}-\text{MDA}(\text{BTDE}-\text{MDA})_2-\text{NE} + 2\text{CH}_3\text{OH}$$
(Polyamic Acid)

$$200° \text{ C.} \Big\downarrow -2\text{H}_2\text{O}$$

$$\text{NE}-\text{MDA}(\text{BTDE}-\text{MDA})_2-\text{NE}$$
(Polyimide Prepolymer)

It has now been discovered that the above-described chemistry is not correct. Surprisingly, it has been discovered that a small amount of the volatiles (water and methanol) are released in the temperature range of about 200° to 315° C. even though the condensation reaction should be complete at 200° C. It is this release of volatiles at or near the cross-linking temperature that causes processing problems during cure and/or postcure. The source of these high temperature volatiles has now been identified, and an improved synthesis to avoid their formation is described below.

DETAILED DESCRIPTION OF THE INVENTION

A correct description of chemistry of the preparation of high temperature PMR polyimides is now presented. The above description approximately defines the beginning and end of the condensation reaction. A more accurate reaction sequence is set forth below.

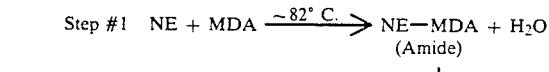

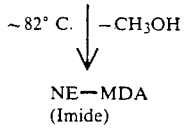

This reaction occurs over a wide temperature range, from about −20° C. to over 82° C.

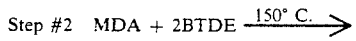

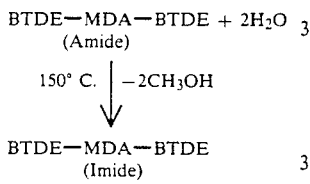

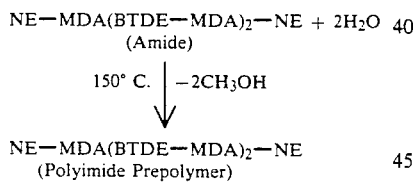

The reaction sequence set forth above more correctly reflects the chemical reactions. Neither this sequence, nor the one previously described, accounts for the fact that a small amount (about 2 to 3%) of volatile components (water and methanol) are released in the temperature range from 200° to 315° C. even though the condensation reactions should be complete at 200° C. It has now been discovered that it is this release of volatiles near or at the cross-linking temperature that causes problems during cure and/or postcure.

In the second reaction sequence, it is seen that in the first step the amine (methylene dianiline) reacts with the nadic ester (the monomethyl ester of 5-norbornene-2,3-dicarboxylic acid).

A secondary reaction has been discovered in addition to:

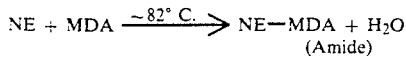

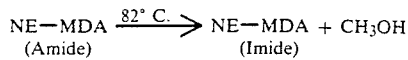

This secondary reaction may be represented:

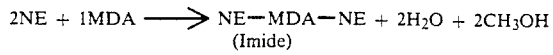

The concentration of this secondary product is low in fresh prepolymer, but gradually increases with time. It has been found that typical times for significant buildup of this product in polyimide prepolymer are:

−18° C.—about 2 years
4° C.—about 1 year
20° C.—about 30 days
82° C.—about 10 minutes While not wishing to be bound by any theory, it is believed that there are three basic reasons why the presence of increasing concentrations of NE-MDA-NE result in increasing processing problems and probable degradation of physical properties of the cured resin. They are:

1. NE-MDA-NE is converted, at the crosslinking temperature (288° C.) to a BMI-type resin, and remains as an adulterant in the cured system. The brittle characteristics of the BMI-type systems are well documented.

2. Since NE-MDA-NE formation is an irreversable reaction, its formation consumes MDA which otherwise would be used to form the molecule needed to produce the desired molecular weight of 1500. This loss of MDA reduces the mole ratio of MDA/BTDE from the desired value of 3.087/2.087 to a lower value, hence increasing the molecular weight. (a 1/1 mole ration will result in an indefinite molecular weight). Increased molecular weight reduces flow in the intermediate temperature range, thus complicating the timely expulsion of volatile materials.

3. The irreversable consumption of NE removes from the system end cap units which control molecular weight build up and also are essential to the proper crosslinking reaction. Also, lack of end cap units can result in unendcapped BTDE-MDA units, which will continue to cure by a condensation reaction, with the continued release of methanol and water.

It is an important aspect of the present invention to carry out, prior to resin formulation, a reaction between NE and MDA to form the desired NE-MDA dimer and to suppress formation of the undesired NE-MDA-NE trimer. In the practice of the present invention it is advantageous to purify the NE-MDA dimer produced by the reaction of NE and MDA to remove NE-MDA-NE trimer. In order to suppress trimer formation, an excess of the MDA should be used, and the NE should be added slowly to the MDA, to maintain a large excess of MDA. When the reaction is complete, the product is purified by suspension in hot 1N hydrochloric acid, and hot filtration. The trimer is insoluble, because it does not have a free amine group, and is removed by filtration of the hot suspension. The free amine group on the desired product, NE-MDA, is converted to the hydrochloride salt, which is soluble in hot hydrochloric acid, but crystallizes out on cooling to room temperature. The excess MDA forms a dihydrochloride salt, which is soluble in cold hydrochloric acid. The desired product is filtered off from the cooled down filtrate, washed to remove excess MDA, suspended in water, and treated with dilute alkali (sodium hydroxide, sodium carbonate, etc.) to convert to the free amine. The excess MDA can be recovered by treatment of the cold filtrate with alkali, which regenerates the free base. The amount of excess MDA used depends on an economic trade-off of how much trimer must be discarded compared to the cost of recovering and reusing the excess MDA.

In order that those skilled in the art may better understand how the present invention may be practiced, the following examples are given by way of illustration, and not by way of limitation. All parts and percentages are by weight, unless otherwise noted.

EXAMPLE 1

| | | Materials Summary | | | | | |
|---|---|---|---|---|---|---|---|
| | NE | + | MDA | → NE-MDA | + | $CH_3OH$ | + $H_2O$ |
| M.W. | 196 | | 198 | 344 | | 32 | 18 |
| Moles | 0.8 | | 1.6 | 0.8 | | 0.8 | 0.8 |
| Grams | 157 | | 317 | 275 | | 26 | 14 |

MDA 317 gms + 120 ml $C_2H_5OH$
NE 157 gms + 200 ml $C_2H_5OH$
Deionized Water $H_2O$ 4000 ml
CON HCl 500 ml
NaOH = 200 gms

Procedure

1. Put 317 gms MDA in reaction flask, and add 120 ml EtOH. Heat to bath temperature of 85°–90° C.
2. Suspend 157 gms NE in 200 ml EtOH, and allow solid to settle. Decant solution into addition funnel.
3. Add NE solution, at fast drop rate, to MDA-EtOH solution. Slowly distill off EtOH, as NE is added. Collect distillate, and use it to continue to dissolve balance of NE, by resuspension and decanting.
4. When addition of NE is complete (2–3 hours), reflux for 4 hours, slowly distilling off about ⅜ of the EtOH solvent.
5. Pour reaction product into beaker, and allow to cool overnight. The product will solidify, to a brown granular moist solid.
6. Divide product approximately in half, and treat each half as described below.
7. Heat 2000 ml DI $H_2O$ to about 50°–60° C., and add half of reaction product. Stir to break up clumps, and slowly pour in 250 ml CON HCl. Heat suspension to 100° C. At this point the NE.MDA.HCl is soluble, the $NE_2MDA$ is an insoluble suspension of very small particle size.
8. Using a heated (or preheated) suction funnel, slowly pour about ¼ of suspension into funnel, applying only slight vacuum in filter flask. Cover funnel with watch glass, to limit cool down. Apply suction only to maintain moderate filtration rate. Excessive suction will cause hot solution to boil, which cools it down too rapidly, causing crystallation in the pores of the fitler, and blockage.
9. Continue hot filtration until suspension is used up.
10. Allow hot filtrate to cool overnight.
11. Filter off crystals of NE.MDA.HCl, and wash thoroughly by suspension (3 times) in water, and refiltration.
12 Suspend crystals in water, and stir in 10–15% solution of NaOH, until product is alkaline.
13. Filter off white powder, and wash 3 times with water, by resuspension and refiltration.
14. Dry solid overnight in a warm vacuum oven. Record weight and yield. Submit sample to lab for HPLC analysis.
15. The soluble fraction from Step #11 contains the excess MDA, which is recovered by addition of NaOH solution until the suspension is alkaline. Filter off, wash, dry, and store the solid MDA.

EXAMPLE 2

The procedure described above was repeated using 5-norbornene-2,3-dicarboxylic anhydride in place of the monomethyl ester of 5-norbornene-2,3-dicarboxylic acid. The only change in the procedure is that the anhydride is added slowly, as a dry powder, to the refluxing MDA-alcohol solution. This change is made because the anhydride is only slightly soluble in cold ethanol. Comparable results are obtained using the anhydride.

The NE-MDA dimer is then reacted to produce a polyimide prepolymer. For example, to prepare a PMR-15 polyimide the NE-MDA dimer may be reacted as follows:

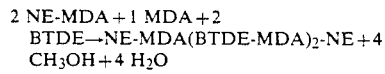
2 NE-MDA + 1 MDA + 2 BTDE→NE-MDA(BTDE-MDA)$_2$-NE + 4 $CH_3OH$ + 4 $H_2O$ The nadic-methylene dianiline dimers according to the present invention may be used to prepare a number of polyimide products in addition to PMR-15. An advantage of these dimers is that the toxicity of free methylene dianiline is significantly reduced. Examples of other polyimide products which may be prepared according to the present invention using nadic-methylene dianiline dimers:

2 NE-MDA + 1 BTDE-MDA-BTDE→PRODUCT

2 NE-MDA + 1 BTDE-MDA + 1 BTDE→PRODUCT

These two examples provide a final product essentially identical to the usual PMR system, but contain MDA only in the pre-reacted form, where its toxicity is greatly diminished.

2 NE-MDA + 1 BTDE→PRODUCT

This example produces a lower molecular weight prepolymer (1000 versus 1500), hence is similar to the usual PMR formulation, but is amine free.

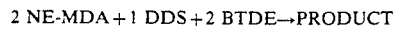
2 NE-MDA + 1 DDS + 2 BTDE→PRODUCT

This formation replaces one third of the MDA with a non-toxic substitute, diaminodiphenyl sulfone (DDS). The prepolymer so produced differs from the standard formulation only in that the middle of the chain contains one sulfone group (—$SO_2$—) in place of a methylene group (—CH$_2$—). The physical properties of the sulfone containing product are similar to the usual PMR formulation, but its toxicity is greatly reduced.

Additional products which may be prepared according to the present invention using nadic-methylene dianiline dimers include PMR-30 and PMR-II-30 formulations, both described by R. Vanucci in *PMR Polyimide Compositions for Improved Performance at 371° C*, published in "SAMPE Quarterly," volume 19, pages 31 to 36 (1987), incorporated herein by reference. Still other products which may be prepared according to the present invention using nadic-methylene dianiline dimers include the LARC-13 formulation, described by A. St. Clair et al., Polymer Engineering and Science, volume 22, pages 9 to 14 (1982), and the LARC-160 formulation, described by P. Young et al., in *Resins for Aerospace*, pages 479–490, American Chemical Society Symposium Series, No. 132 (1980), both of which are incorporated herein by reference.

Compared to the prior preparations of PMR polyimides, a new preblending technique provides the following advantages: longer shelf life, increased resin flow, higher glass transistion temperature, increased heat resistance, reduced laminate microcracking, reduced volatile release at or near cross-linking temperature, longer room temperature shelf life and longer debulking time. The term "debulking time" refers to the debulking process. For thick parts (15-50 plies), it is common practice to layup a few plies, perhaps four, bag, and apply pressure and modest heat, generally 79°-90° C. This process compacts the layup and helps prevent the formation of wrinkles and resin rich areas. Since it is repeated several times, the initial plies are subjected to several thermal cycles, and their ability to retain their utility under these conditions is a desirable characteristic.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for the preparation of a polyimide prepolymer, comprising:
   reacting a nadic compound selected from the group consisting of nadic acid, a monomethyl ester of nadic acid, and nadic anhydride, with methylene dianiline to form a reaction product consisting essentially of a nadic-methylene dianiline dimer, and
   reacting said dimer and methylene dianiline with an ester of benzophenone tetracarboxylic acid to form a polyimide prepolymer.

2. The process set forth in claim 1, wherein methylene dianiline in an amount sufficient to suppress nadic-methylene dianiline- nadic trimer formation is reacted with said nadic compound.

3. The process set forth in claim 2 wherein said nadic compound is a monomethyl ester of 5-norbornene-2,3-dicarboxylic acid.

4. The process set forth in claim 3 wherein said dimer formed by the reaction of monomethyl ester of 5-norbornene-2,3-dicarboxylic acid and methylene dianiline is an amide.

5. The process set forth in claim 4 wherein said amide further reacts to form an imide.

6. The process set forth in claim 3, wherein said ester of benzophenone tetracarboxylic acid is a dimethyl ester.

7. The process set forth in claim 6 wherein said dimethyl ester of benzophenone tetracarboxylic acid and methylene dianiline react to form an amide.

8. The process set forth in claim 7 wherein said amide further reacts to form a polyimide prepolymer.

9. The process set forth in claim 2 wherein said nadic compound is 5-norbornene-2,3-dicarboxylic anhydride.

10. The process set forth in claim 9, wherein said dimer formed by the reaction of 5-norbornene-2,3-dicarboxylic anhydride and methylene dianiline react is an amide.

11. The process set forth in claim 10, wherein said amide further reacts to form an imide.

12. The process set forth in claim 9 wherein said ester of benzophenone tetracarboxylic acid is a dimethyl ester.

13. The process set forth in claim 12 wherein said dimethyl ester of benzophenone tetracarboxylic acid and methylene dianiline react to form an amide.

14. The process set forth in claim 13 wherein said amide further reacts to form a polyimide prepolymer.

15. A process for the preparation of a polyimide prepolymer, comprising:
    reacting a nadic compound selected from the group consisting of nadic acid, a monomethyl ester of nadic acid, and nadic anhydride, with methylene dianiline to form a reaction product consisting essentially of a nadic-methylene dianiline dimer, and
    reacting said dimer and diaminodiphenyl sulfone with an ester of benzophenone tetracarboxylic acid to form a polyimide prepolymer.

16. The process set forth in claim 15 wherein said nadic compound is a monomethyl ester of 5-norbornene-2,3-dicarboxylic acid or 5-norbornene-2,3-dicarboxylic anhydride.

17. The process set forth in claim 16 wherein said dimer formed by the reaction of monomethyl ester of 5-norbornene-2,3-dicarboxylic acid and methylene dianiline is an amide.

18. The process set forth in claim 17 wherein said amide further reacts to form an imide.

19. The process set forth in claim 16, wherein said ester of benzophenone tetracarboxylic acid is a dimethyl ester.

20. The process set forth in claim 19 wherein said dimethyl ester of benzophenone tetracarboxylic acid and methylene dianiline react to form an amide.

21. The process set forth in claim 20 wherein said amide further reacts to form a polyimide prepolymer.

22. A process for the preparation of a polyimide prepolymer, comprising:
    reacting a nadic compound selected from the group consisting of nadic acid, a monomethyl ester of nadic acid, and nadic anhydride, with methylene dianiline to form a reaction product consisting essentially of a nadic-methylene dianiline dimer, and
    reacting said dimer with an ester of benzophenone tetracarboxylic acid to form a polyimide prepolymer.

23. The process set forth in claim 22 wherein said nadic compound is a monomethyl ester of 5-norbornene-2,3-dicarboxylic acid or 5-norbornene-2,3-dicarboxylic anhydride.

24. The process set forth in claim 23 wherein said dimer formed by the reaction of monomethyl ester of 5-norbornene-2,3-dicarboxylic acid and methylene dianiline is an amide.

25. The process set forth in claim 24 wherein said amide further reacts to form an imide.

26. The process set forth in claim 23, wherein said ester of benzophenone tetracarboxylic acid is a dimethyl ester.

27. The process set forth in claim 26 wherein said dimethyl ester of benzophenone tetracarboxylic acid and methylene dianiline react to form an amide.

28. The process set forth in claim 27 wherein said amide further reacts to form a polyimide prepolymer.

29. A process for the preparation of a polyimide prepolymer, comprising:
 reacting a nadic compound selected from the group consisting of nadic acid, a monomethyl ester of nadic acid, and nadic anhydride, with methylene dianiline to form a reaction product consisting essentially of a nadic-methylene dianiline first dimer,
 reacting an ester of benzophenone tetracarboxylic acid with methylene dianiline to from a second dimer, and
 reacting said first dimer and said second dimer with an ester of benzophenone tetracarboxylic acid to form a polyimide prepolymer.

30. The process set forth in claim 2 wherein said nadic compound is a monomethyl ester of 5-norbornene-2,3-dicarboxylic acid or 5-norbornene-2,3-dicarboxylic anhydride.

31. The process set forth in claim 1, including purifying said reaction product to remove nadic-methylene dianiline-nadic trimer and form a reaction produce consisting essentially of a nadic-methylene dianiline dimer before reacting said dimer to form a polyimide prepolymer.

32. The process set forth in claim 15, including purifying said reaction product to remove nadic-methylene dianiline-nadic trimer and form a reaction product consisting essentially of a nadic-methylene dianiline dimer before reacting said dimer to form a polyimide prepolymer.

33. The process set forth in claim 22, including purifying said reaction product to remove nadic-methylene dianiline-nadic trimer and form a reaction product consisting essentially of a nadic-methylene dianiline dimer before reacting said dimer to form a polyimide prepolymer.

34. The process set forth in claim 29, including purifying said reaction product to remove nadic-methylene dianiline-nadic trimer and form a reaction product consisting essentially of a nadic-methylene dianiline first dimer before reacting said first dimer and said second dimer to form a polyimide prepolymer.

35. The process set forth in claim 15, wherein methylene dianiline in an amount sufficient to suppress nadic-methylene dianiline-nadic trimer formation is reacted with said nadic compound.

36. The process set forth in claim 22, wherein methylene dianiline in an amount sufficient to suppress nadic-methylene dianiline-nadic trimer formation is reacted with said nadic compound.

37. The process set forth in claim 29, wherein methylene dianiline in an amount sufficient to suppress nadic-methylene dianiline-nadic trimer formation is reacted with said nadic compound.

* * * * *